United States Patent [19]

Hill et al.

[11] Patent Number: 5,546,282

[45] Date of Patent: Aug. 13, 1996

[54] TELECOMMUNICATION NETWORK DIGITAL CROSS-CONNECT PANELS HAVING INSERTABLE MODULES WITH PRINTED CIRCUIT BOARD MOUNTED COAXIAL JACK SWITCHES

[75] Inventors: Timothy L. Hill; Brian J. Allen, both of Spokane, Wash.; William P. Jonas, Athol, Id.; James P. Kennedy, Spokane, Wash.

[73] Assignee: Telect, Inc., Liberty Lake, Wash.

[21] Appl. No.: 432,903

[22] Filed: May 2, 1995

[51] Int. Cl.[6] ............................................. H05K 7/14
[52] U.S. Cl. .......................... 361/796; 361/752; 361/801; 439/668; 439/61
[58] Field of Search ....................... 361/752, 796, 361/756, 802, 801, 733; 439/61, 607, 188, 609, 668, 610; 200/51.03, 51.04, 51.09, 51.1; 174/50

[56] References Cited

U.S. PATENT DOCUMENTS

| | | | |
|---|---|---|---|
| 4,002,399 | 1/1977 | Deitch et al. | |
| 4,423,466 | 12/1983 | Beun | 439/668 |
| 4,426,558 | 1/1984 | Tanaka et al. | 200/51.09 |
| 4,609,242 | 9/1986 | Kemppainen | |
| 4,628,159 | 7/1986 | Deitch et al. | 200/51.05 |
| 4,705,921 | 11/1987 | Rabey et al. | 200/51.09 |
| 4,749,968 | 6/1988 | Burroughs | 333/105 |
| 4,770,639 | 9/1988 | Lau | 439/61 |
| 4,797,114 | 1/1989 | Lau | 439/668 |
| 4,815,104 | 3/1989 | Williams et al. | 375/36 |
| 4,820,200 | 4/1989 | Lau | 200/51.09 |
| 4,840,568 | 6/1989 | Burroughs et al. | 439/49 |
| 4,861,281 | 8/1989 | Warner | 439/668 |
| 4,874,317 | 10/1989 | Lau | 439/61 |
| 4,975,087 | 12/1990 | Williams et al. | 439/668 |
| 5,078,624 | 1/1992 | Burroughs et al. | 439/668 |
| 5,233,501 | 8/1993 | Allen et al. | 361/733 |

FOREIGN PATENT DOCUMENTS

| | | | |
|---|---|---|---|
| 1582238 | 10/1990 | U.S.S.R. | 439/188 |
| 2111770 | 7/1983 | United Kingdom | 439/668 |
| 2112589 | 12/1983 | United Kingdom | 439/668 |

OTHER PUBLICATIONS

Product Brochure, "PIX–DSX–1", ADC Telecommunications, pp. 124–125 (undated).
Product Brochure, "Front Cross–Connect 24 Termination PIX–DSX–3", ADC Telecommunications, pp. 150–151 (undated).

(List continued on next page.)

Primary Examiner—Leo P. Picard
Assistant Examiner—Y. Whang
Attorney, Agent, or Firm—Wells, St. John, Roberts, Gregory & Matkin, P.S.

[57] ABSTRACT

A telecommunication network cross-connect panel 10 is described having a chassis 14 for receiving insertable modules 12, 212. The chassis 14 has a back wall 24 with a backplane printed circuit board 34. An array of rear coaxial connectors are mounted to the backplane printed circuit board 34 in columns of four connectors 36, 38, 40 and 42 for terminating and cross-connecting two pieces of telecommunication equipment per column. Female DIN connector receptacles 44 are mounted on the front side of the board 34 at spaced slot locations with each receptacle 44 electrically connected to a corresponding four backplane connectors of a corresponding column. A plurality of modules 12 are insertable into the slots for interconnecting male DIN connector plugs 58 into corresponding aligned DIN connector receptacles 44. A plug 58 is mounted on a rear end of a module printed circuit board 50. A plurality of coaxial mini-WECO jacks are mounted to a front end of the printed circuit board 50 and electrically connected through the board 50 to the plugs 58. A panel face plate 52 is mounted on the front end of the board 50 with apertures for receiving forward ends of the jacks 60, 62, 64 and 65. The backplane is capable of being pre-wired to terminate various telecommunications apparatuses, prior to the insertion the modules 12 or 212.

9 Claims, 11 Drawing Sheets

OTHER PUBLICATIONS

Product Brochure, "Rear Cross–Connect 24 Termination PIX–DSX–3", ADC Telecommunications, pp. 152–153 (undated).

Product Brochure, "Fiber Distribution Center Product Family, Connector Panel Housing and Connector Panel Center (CPC)", SIECOR, pp. 2–19 and 2–31 (undated).

TELECOMMUNICATION NETWORK DIGITAL CROSS-CONNECT PANELS HAVING INSERTABLE MODULES WITH PRINTED CIRCUIT BOARD MOUNTED COAXIAL JACK SWITCHES

TECHNICAL FIELD

This invention relates to digital telecommunication network cross-connect panels having coaxial cross-connect modules with printed circuit board mounted co-axial jack switches, such as illustrated in U.S. Pat. No. 5,233,501 granted Aug. 3, 1993 to Allen et. al.

BACKGROUND OF THE INVENTION

Digital signal cross-connect equipment plays a very vital role in the installation, monitoring, testing, restoring and repairing digital telecommunication networks. Digital signal cross-connect modules are frequently used in digital networks to provide a central cross-connect location that is convenient for testing, monitoring, restoring and repairing the digital signals and associated equipment. The digital cross-connect modules provide temporary jack access to the digital signals to monitor the signals and to test and repair the digital signals and telecommunication equipment. Digital signal cross-connect modules are most frequently used in both large and small telephone central offices, remote sites and customer premises. It is necessary that with respect to the remainder of the network, the digital signal cross-connect module must appear transparent. This is particularly true and most critical when dealing with digital signals that are transmitted at line rates in excess of 40 million bits per second (Mbps).

A very successful digital signal cross-connect module is illustrated in U.S. Pat. No. 4,815,104 granted to Wayne E. Williams et al. on Mar. 21, 1989. Such patent is referred to and incorporated by reference with respect to the background of this invention.

Another successful digital signal cross-connect module is illustrated in U.S. Pat. No. 5,233,501 granted Aug. 3, 1993 to Allen et. al. Such patent is referred to and incorporated by reference with respect to the background of this invention.

This invention is an improved high density digital telecommunications network, cross-connect module panel that has several improvements, such as a panel backplane that can be completely prewired prior to the installation of modules.

These and other objects and advantages of this invention will become apparent upon reading the following detailed description of a preferred embodiment.

BRIEF DESCRIPTION OF THE DRAWINGS

Preferred embodiments of the invention are described below with reference to the accompanying drawings, which are briefly described below.

FIG. 9 is side view of the module shown in FIG. 7 illustrating a plurality of vertically spaced coaxial switch jacks for receiving plugs of coaxial patch cords or the like.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Referring now to the drawings, FIGS. 1–6 show a preferred telecommunication network termination panel 10 for receiving a plurality of digital coaxial cross-connect modules 12 to terminate and normally transparently cross-connect various telecommunication equipment. The modules 12 enable a telecommunication tester, monitor or repair person to utilize a patch cord to isolate any one of the pieces telecommunication equipment and reroute the isolated piece of from the front of the panel to a different module for interconnection.

The panel 10 has a panel chassis 14 that is elongated and is normally mounted horizontal between panel rack uprights (not shown). Normally a plurality of panels 10 are stacked one on top of another at a termination rack. Panel chassis 14 includes a top wall 16, a bottom wall 18, a side wall 20, a side wall 22, a back wall 24 and a front wall 29. Rack mounting brackets 23 are affixed to the side walls 20,22 to assist in mounting a panel 10 to the rack uprights. The back wall 24 defines a panel backplane where the pieces of telecommunication are terminated using coaxial cables. The coaxial cables are normally supported adjacent the backplane by one or more cable supports 26 that extends outward from the back wall 24.

The chassis 14 has an interior cavity or space with a large front opening in the front wall 29 for receiving a plurality of the insertable modules 12. The interior cavity is subdivided into module slots. Grooves 30 are formed in bottom and top ledges of the large front opening in the front wall 29 to receive and guide insertable modules 12 into respective slots as illustrated in FIGS. 1–6. The top and bottom walls 16,18 have guide ribs 32 formed therein to guide and align the modules 12 in respective slots.

Importantly, the back wall 24 has a backplane printed circuit board 34 that extends substantially the width of the chassis 14. The printed circuit board 34 has a front facing side and a rear facing side. The backplane printed circuit board 34 includes conductive outer layers (not shown) that provide ground planes to minimize the transfer of stray signals that would interfere or compromise the transmission of the high rate digital signals.

A plurality of backplane coaxial cable connectors are mounted on the rear facing side of the backplane printed circuit board 34 in an array of vertical columns that are horizontally spaced across the rear of the back wall 24. Each column contains sufficient backplane coaxial cable connectors to terminate and interconnect at least two pieces of telecommunication equipment. Preferably each column has a backplane input coaxial cable connector 36, a backplane output coaxial cable connector 38, an input cross-connect coaxial cable connector 40, and an output cross-connect coaxial cable connector 42. Each of the coaxial cable connectors 36, 38, 40, and 42 are affixed to the rear facing side of the board 34 and project outward therefrom as illustrated in FIGS. 2, 4–6. The coaxial cable connectors 36, 38, 40, and 42 are preferably BNC or TNC coaxial cable connectors frequently referred to as installer cable connectors.

The coaxial cable connectors 36, 38, 40, and 42 are respectively connected to the digital signal lines of telecommunication equipment in which the input connector 36 is connected to a digital signal input portion of a first line or first telecommunication apparatus of a telecommunication network (not shown). The output connector 38 is connected to the output portion of the first line or first telecommunication equipment (not shown). The cross-connect input connector 40 is connected to an input portion of a second line or second telecommunication apparatus (not shown). The cross-connect output connector 42 is connected to an output portion of the second line or second piece of telecommunication equipment (not shown). Coaxial cables (not shown) are used to connect the telecommunication equipment to the backplane coaxial connectors 36, 38, 40, and 42. Frequently the coaxial cables are placed and supported in trays that extend generally horizontal along the back of panels 10 with the termination end of the coaxial cables supported by the cable support 26.

Generally once the coaxial cables are connected to the backplane coaxial connectors 36, 38, 40, and 42, they are seldom disconnected. For the purpose of this invention, it will be considered that the coaxial cables are rather permanently fastened to the connectors 36, 38, 40, and 42, although it is recognized that such cables may be disconnected from the backplane coaxial connectors when the telecommunication equipment is being rearranged, disassembled or the like. One of the advantages of this invention is that many or all of the cables may be pre-wired to the backplane coaxial cable connectors at one time to save time and difficulty of separately connecting the cables at a latter date when the chassis 14 is fully loaded with modules 12.

Figure 1:
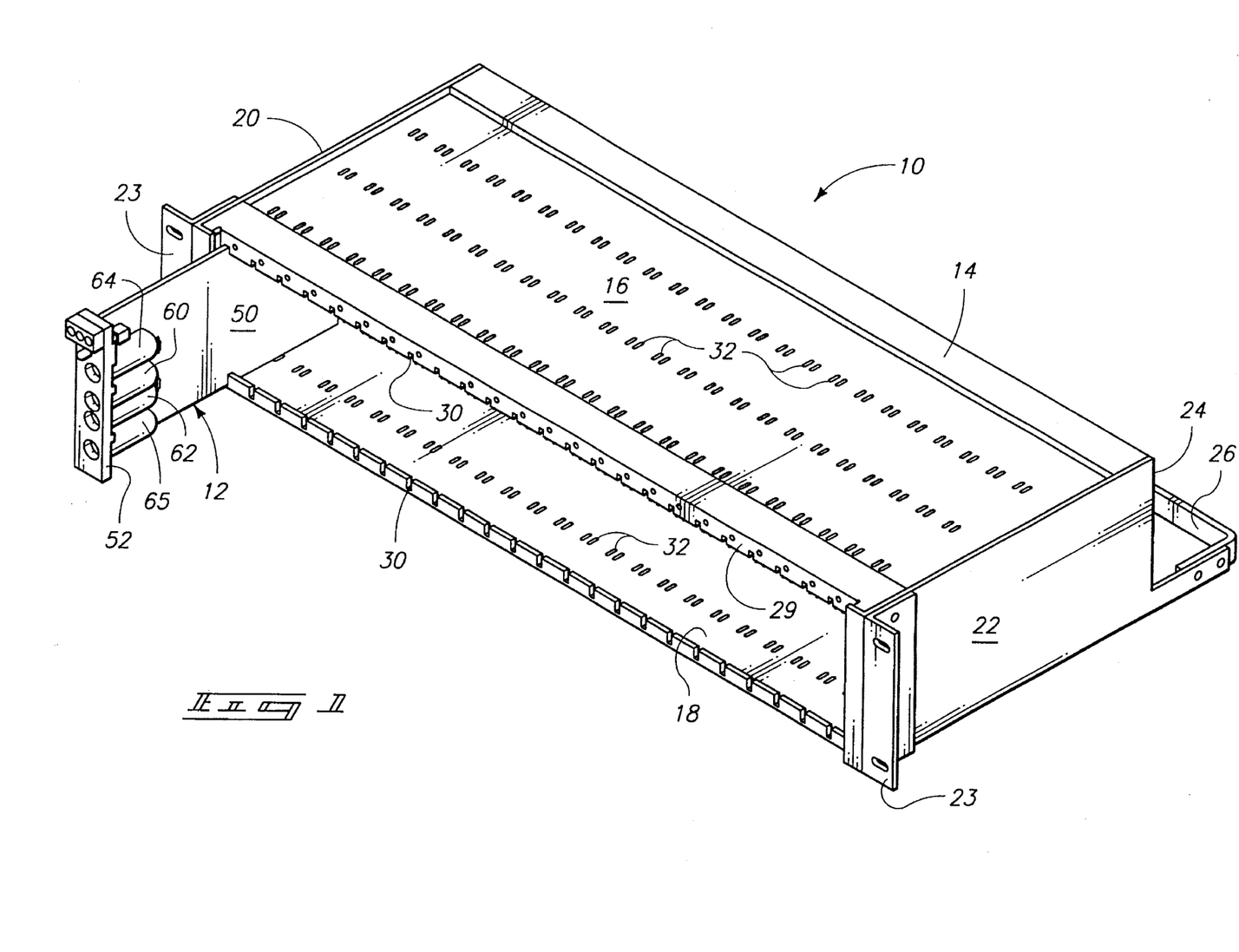
FIG. 1 is an isometric view of a preferred embodiment, showing one module being inserted into a panel chassis.
Figure 2:
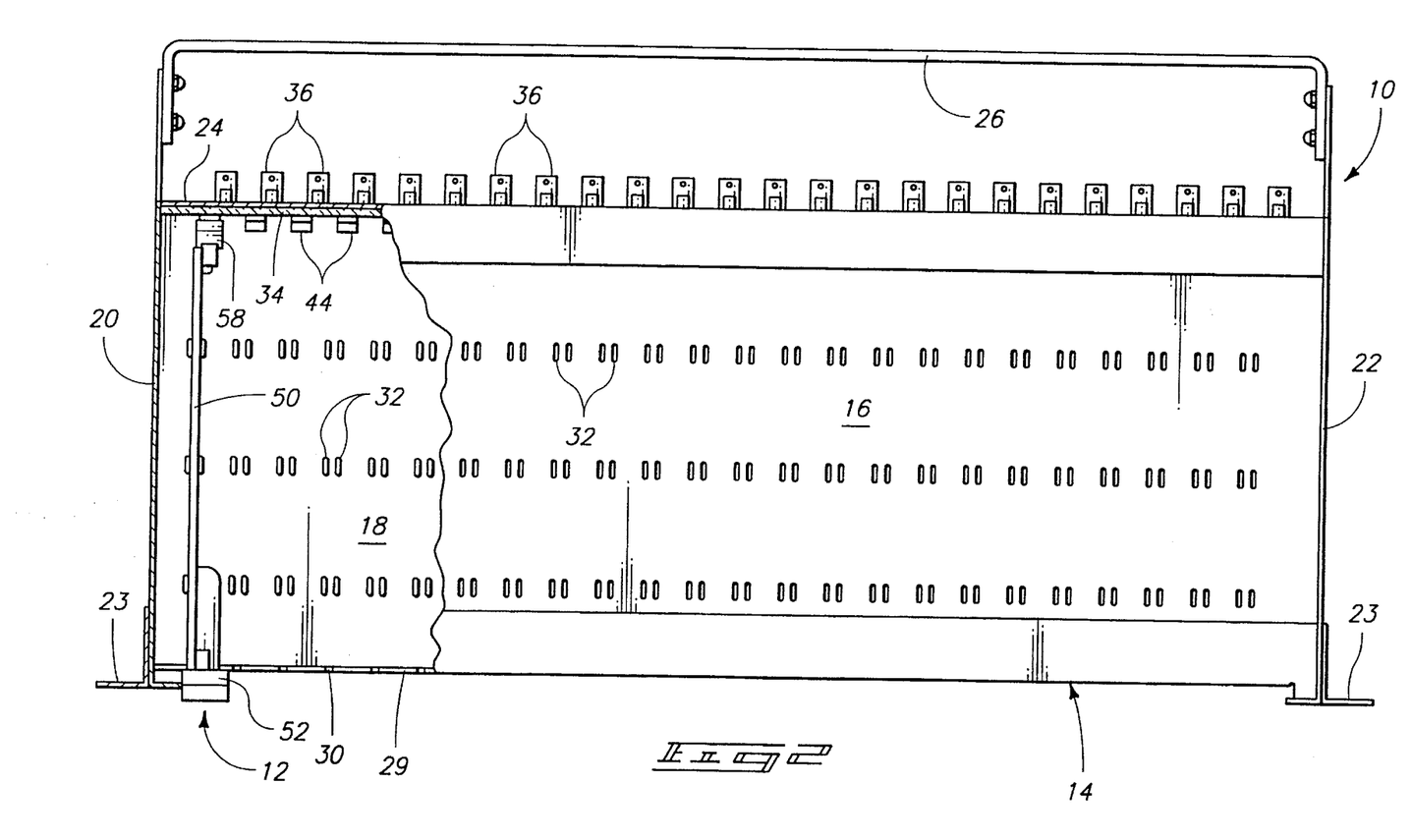
FIG. 2 is a top view of the panel chassis illustrated in FIG. 1 with a portion of a top wall removed to expose the interior of the chassis with one module inserted.
Figure 3:
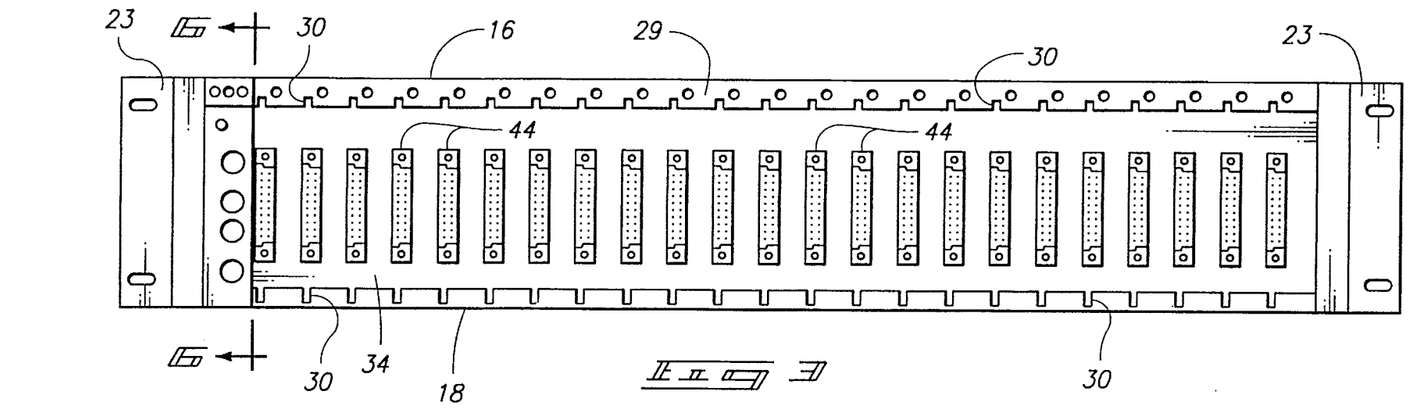
FIG. 3 is a front view of the panel chassis of FIG. 1 showing the one module inserted.
Figure 4:
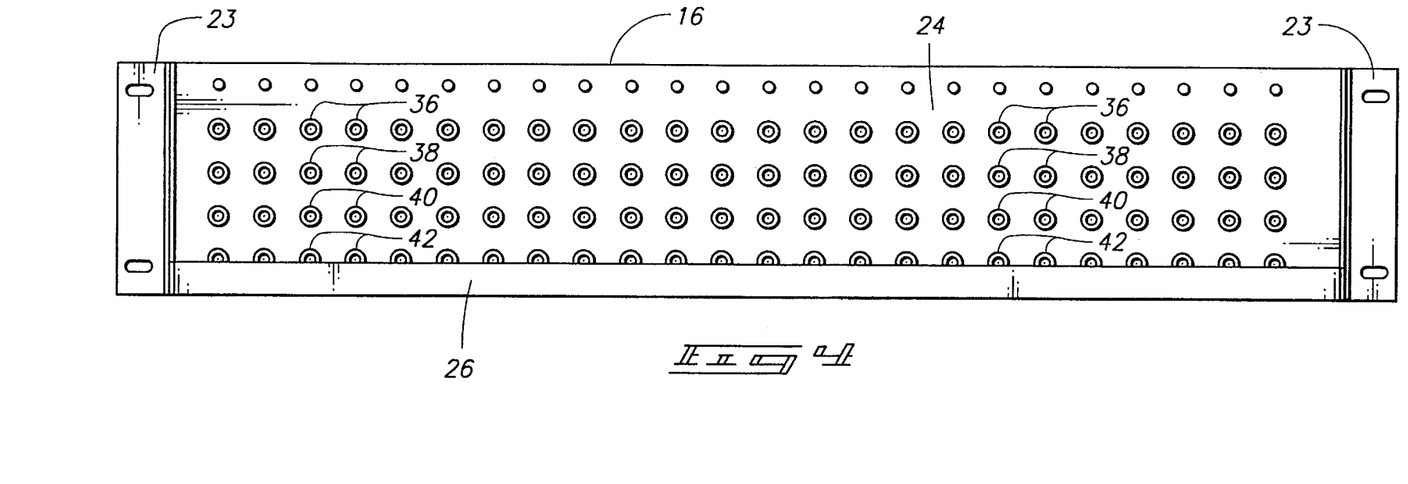
FIG. 4 is a rear view of the panel chassis of FIG. 1 showing the panel backplane.
Figure 5:
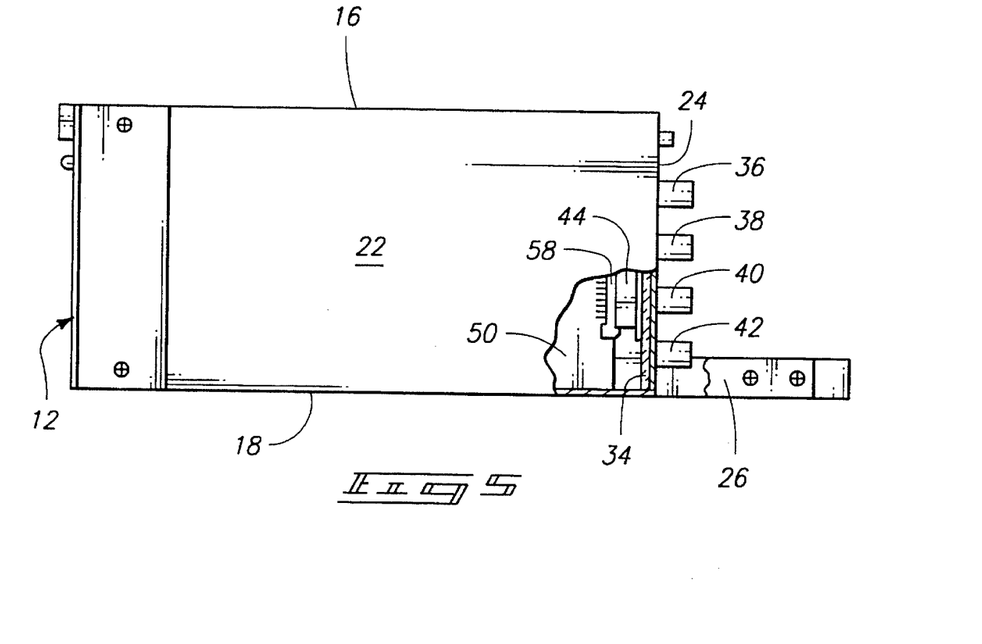
FIG. 5 is a side view of the panel chassis of FIG. 1 with a portion of a side wall removed to illustrate a side view of the backplane of the panel.
Figure 6:
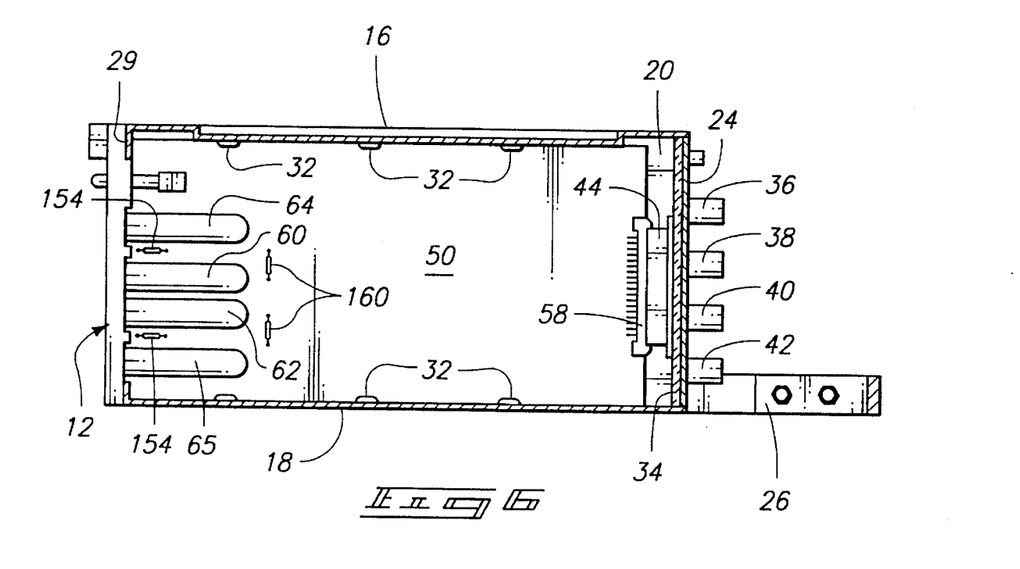
FIG. 6 is a vertical cross-section taken along line 6—6 in FIG. 3 illustration the one module inserted into a backplane printed circuit board connector.

A plurality of elongated printed circuit board connectors 44, preferably female DIN connector receptacles, are mounted in upright orientations to the front facing side of the backplane printed circuit board 34 (FIGS. 3 and 6). Each DIN connector receptacle 34 is associated with a corresponding module slot and is electrically connected to a corresponding column of backplane coaxial cable connectors 36, 38, 40, and 42. Preferably the DIN connector 44 is a DIN connector plug receptacle.

As illustrated in FIGS. 7–10, each cross-connect module 12 has a housing with a multi-layer module printed circuit board 50 that extends from a front end of the housing to a rear end of the housing. The printed circuit board 50 includes conductive outer layers (not shown) that provide, ground planes to minimize the transfer of stray signals that would interfere or compromise the transmission of the high rate digital signals.

Figure 7:
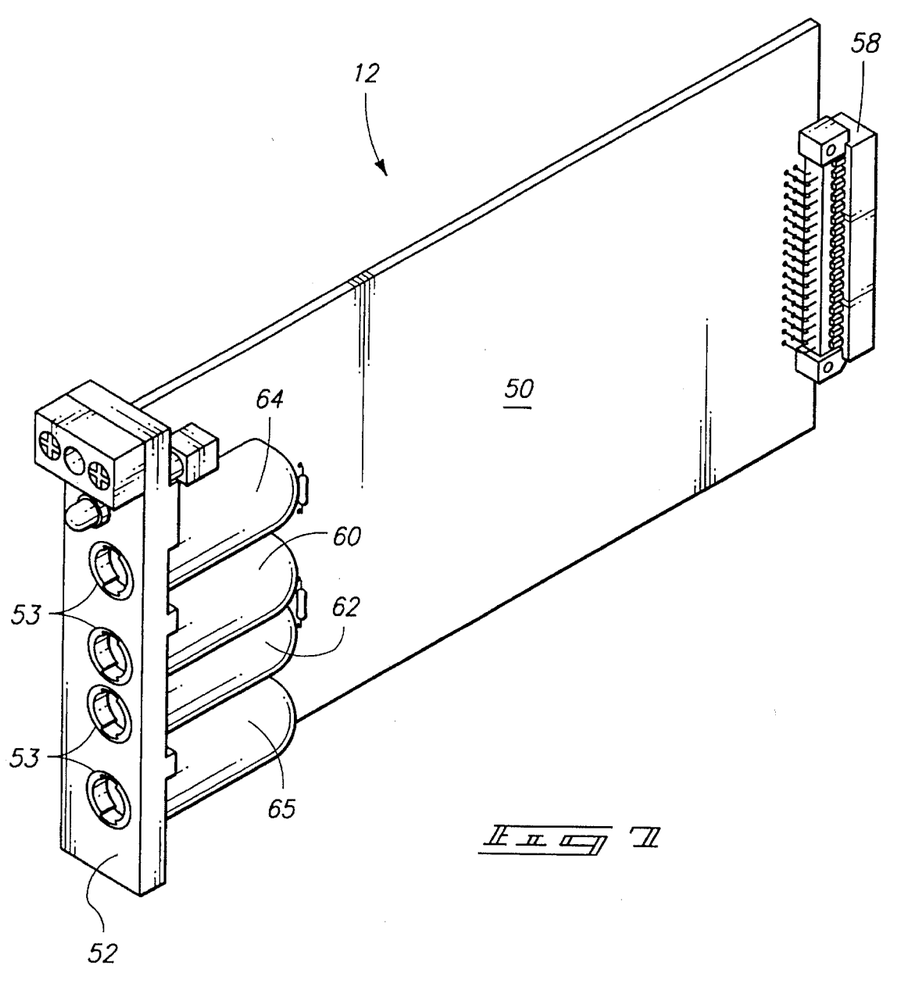
FIG. 7 is an isometric view of the one module.
Figure 8:
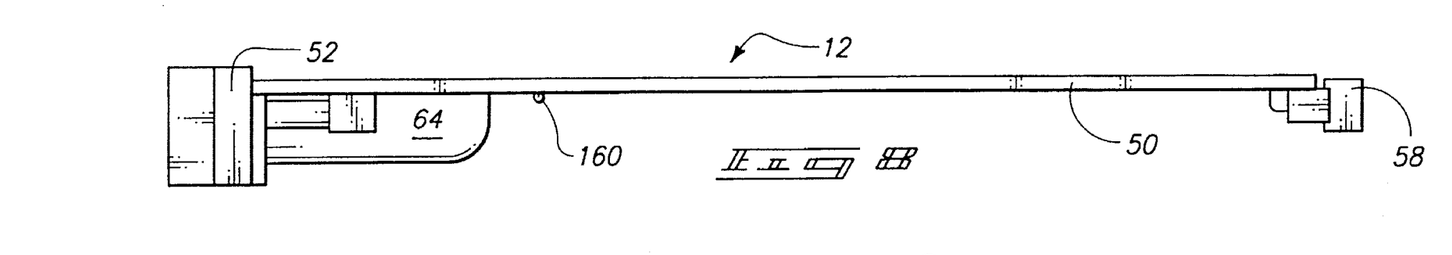
FIG. 8 is a top view of the module shown in FIG. 7.
Figure 9:
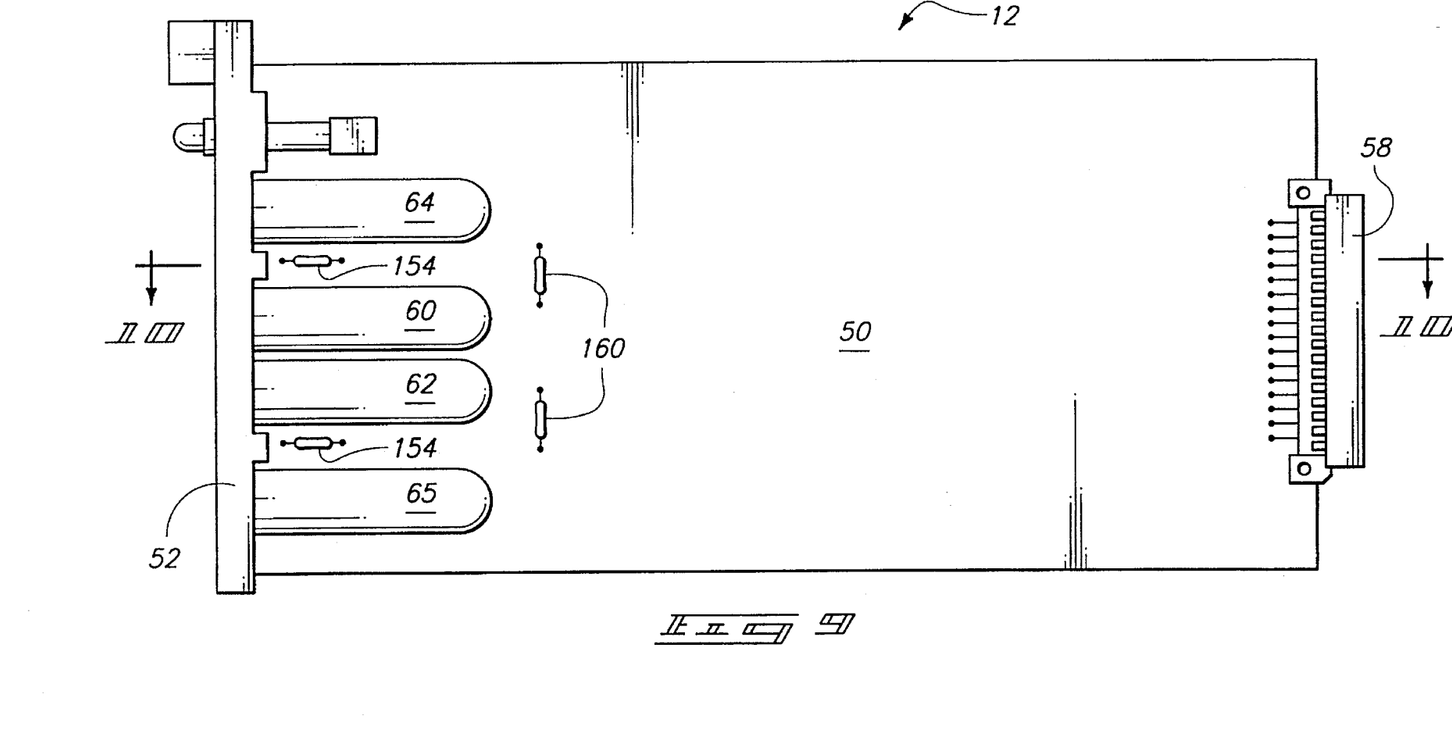
Figure 10:
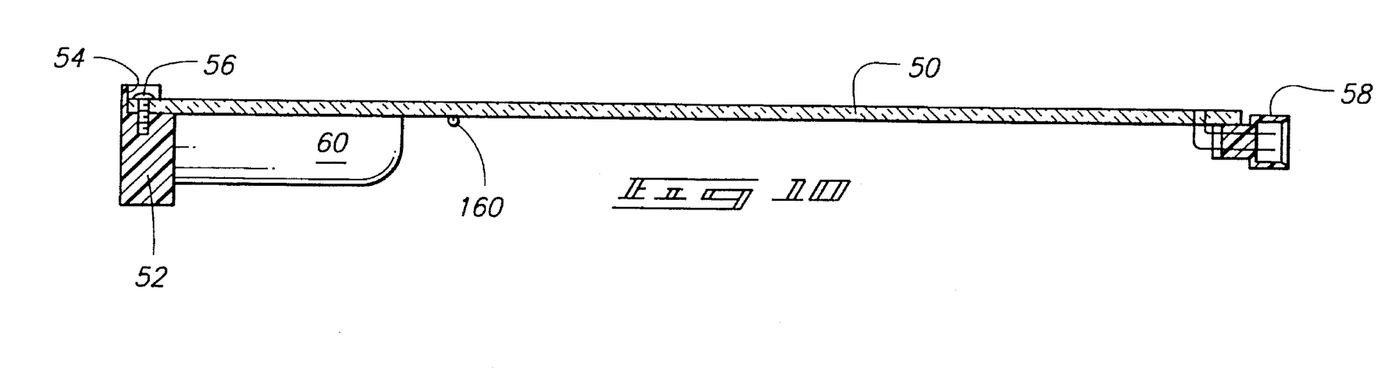
FIG. 10 is a horizontal cross-sectional view taken along line 10—10 in FIG. 9.

The module housing includes a panel face 52 mounted at the front end of the housing. The module panel face plate 52 has jack receiving apertures 53 formed therein at vertically spaced locations as illustrated in FIG. 7. The module panel face 52 has a side slot 54 (FIG. 10) formed therein to receive the forward end of the module printed circuit board 50. The face 52 is secured to the forward end by fasteners 56, such as screws.

An elongated printed circuit board connector 58 is mounted on the rear end of the printed circuit board 50 for mating with the connector 44 when the module 12 is inserted into the chassis 14. Preferably the connector 58 is a male DIN connector plug. When a module 12 is properly inserted into a respective slot, the connector plug 58 is aligned and projects into the connector receptacle 44 to provide electrical interconnection between the jacks 60 and 62 and the backplane coaxial cable connectors 36, 38, 40 and 42.

Importantly, the module 12 includes front coaxial mini-WECO jacks 60 and 62. Jack 60 is referred to as an input jack and jack 62 is referred to as an output jack. Preferably the module 12 includes two monitor jacks 64 and 65 for monitoring input and output cross-connect signals.

Each of the jacks 60 and 62 has a jack housing 66 that is of a general cylindrical shape comprising a barrel 68 having a forward end 70 with a plug opening 72 formed therein extending inward to a plug receiving cavity 73 of a rather traditional configuration. However, the jack housing 66 has a rear end 74 with a curved portion that is affixed to the inside surface of the board 50. A central female conductor 76 is mounted coaxially within the plug receiving cavity 73 with a rear curved section 78 at the rear end 74 that extends and terminates in a printed circuit board terminal 80 for transmitting a digital signal between the central female conductor of the jack and a central male coaxial conductor 172 of a coaxial plug 170. Additionally, the jack housing 66 has printed circuit board terminals 81 that extend outward from the barrel for connecting with printed circuit ground plane conductors.

The jack housing 66 has a jack switch cavity 82 formed in a side of the barrel 68 spaced from the central female conductor 76. Importantly a jack switch is mounted in the jack switch cavity 82. The jack switch has a stationary or a substantially stationary switch contact element 84 mounted on housing guides 85 within the jack switch cavity 82. The stationary switch contact element 84 has a substantially stationary contact end 86 that extends to a printed circuit board switch terminal 90.

The jack switch further includes a movable switch contact element 92 in the form of a leaf spring with a projecting leaf spring end 96. The movable switch contact element 92 extends from the end 96 to a printed circuit board switch terminal 102. The movable switch contact element 92 is mounted in the jack switch cavity 82 by housing guides 100.

The jack switch further includes a switch actuating means that includes a leaf spring element 106 that is mounted in the switch cavity 82 by housing mounting guides 108. The leaf spring element 106 has a lever section 110 that extends outward overlying the projecting leaf spring end 96 of the movable switch contact element 92. Lever section 110 has contact engaging end 112 for engaging the projecting leaf spring end 96 to terminate the digital signal previously being transmitted via the stationary contact 84 and the movable contact 92. The leaf spring element 106 extends from the lever section 110 to a printed circuit board actuation terminal 116. The leaf switch element 106 includes a non-conductive bumper element 118 mounted on the lever section 110 which is engaged by forward end of a plug 170 for moving the lever section 110 from a non-contact position to an initial contact position. The contacting end 112 engages the projecting leaf spring end 96 terminating or grounding the digital signal and then proceeds to move the projecting leaf spring end 96 to break the leaf spring contact element 92 from the stationary contact end 86 to open the jack switch and interrupt the transmission of the digital signal.

Figure 11:
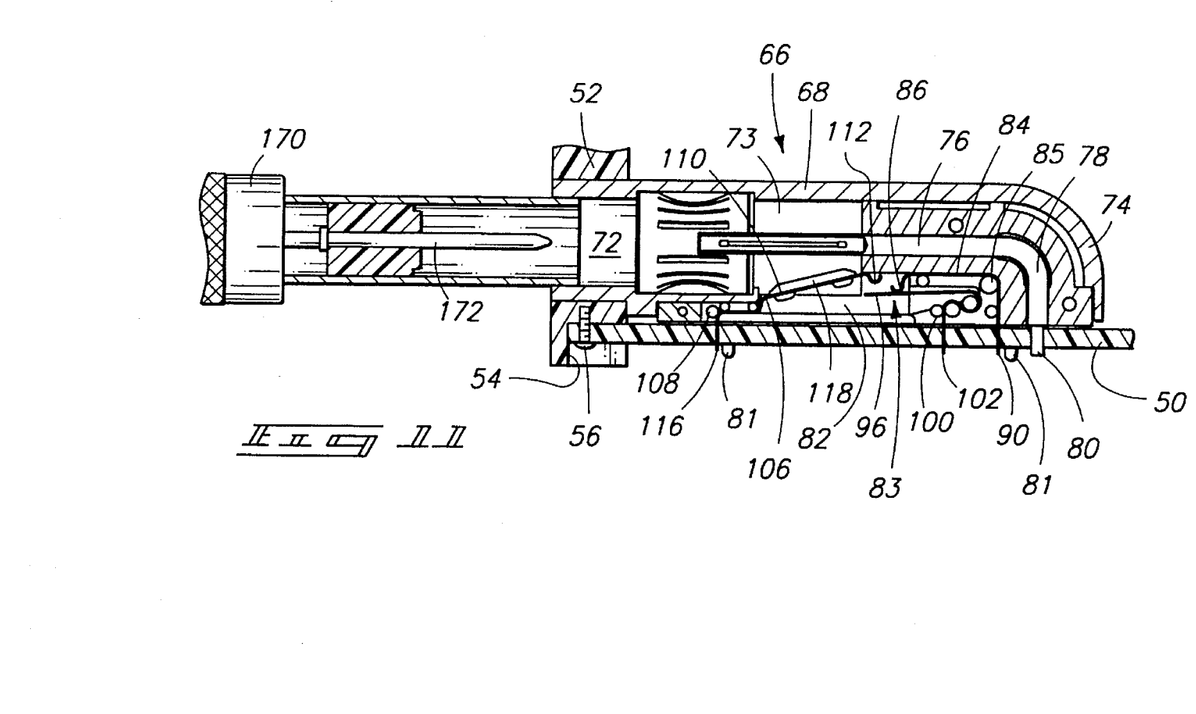
FIG. 11 is a horizontal cross-sectional view of one of the coaxial switch jacks illustrating the initial insertion of a coaxial plug.
Figure 12:
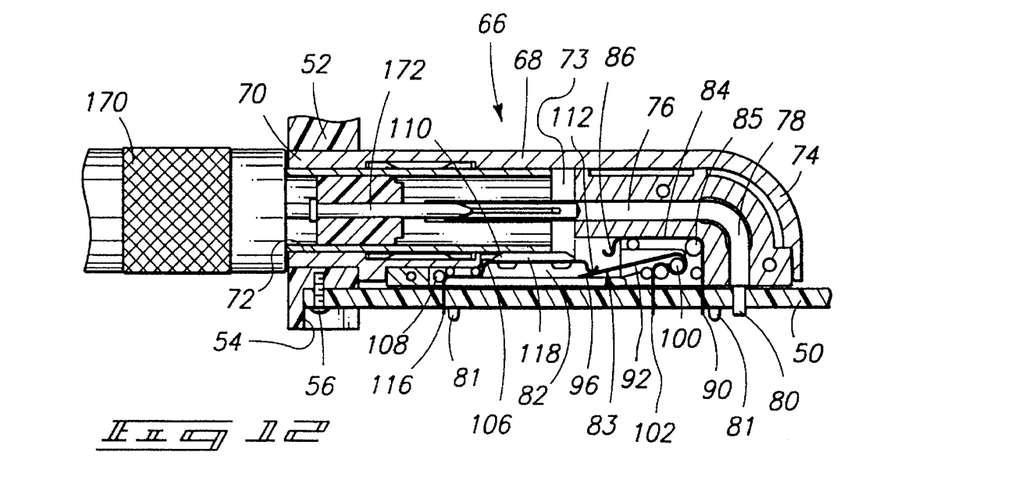
FIG. 12 is a horizontal cross-sectional view similar to FIG. 11 except the coaxial plug being fully inserted into the jack to interrupt a cross/connect circuit.

A sequence of operation of the jack switch is illustrated in FIGS. 11 and 12. FIG. 11 illustrates the initial insertion of a coaxial plug 170 such as a coaxial plug cable or an element of a looping plug. It should be noted that the bumper 118 is in the path of the sleeve of the plug 170 as the plug 170 is fully inserted as illustrated in FIG. 12, and the central male coaxial conductive element 172 engages the central female conductor 76 of the jack interconnecting the plug with the jack. It should be noted at this point that the bumper 118 is engaged by the frontal surface of the sleeve of the plug 170 causing the bumper 118 to move downwardly, biasing the lever section 110 downward with the engaging end 112 engaging the projecting leaf spring end 96 terminating the digital signal to a preset termination voltage.

Further insertion of the plug 170 as illustrated in FIG. 12 deflects lever section 110 causing engaging end 112 to further press against the projecting leaf spring end 96 to cause the leaf spring contact section 94 to disengage from the contact end 86 of the stationary contact element 84. Such disengagement interrupts the digital signal between the telecommunication apparatuses enabling the jack 60, 62 to communicate directly with the respective telecommunication apparatus from the front of the panel 10.

Figure 13:
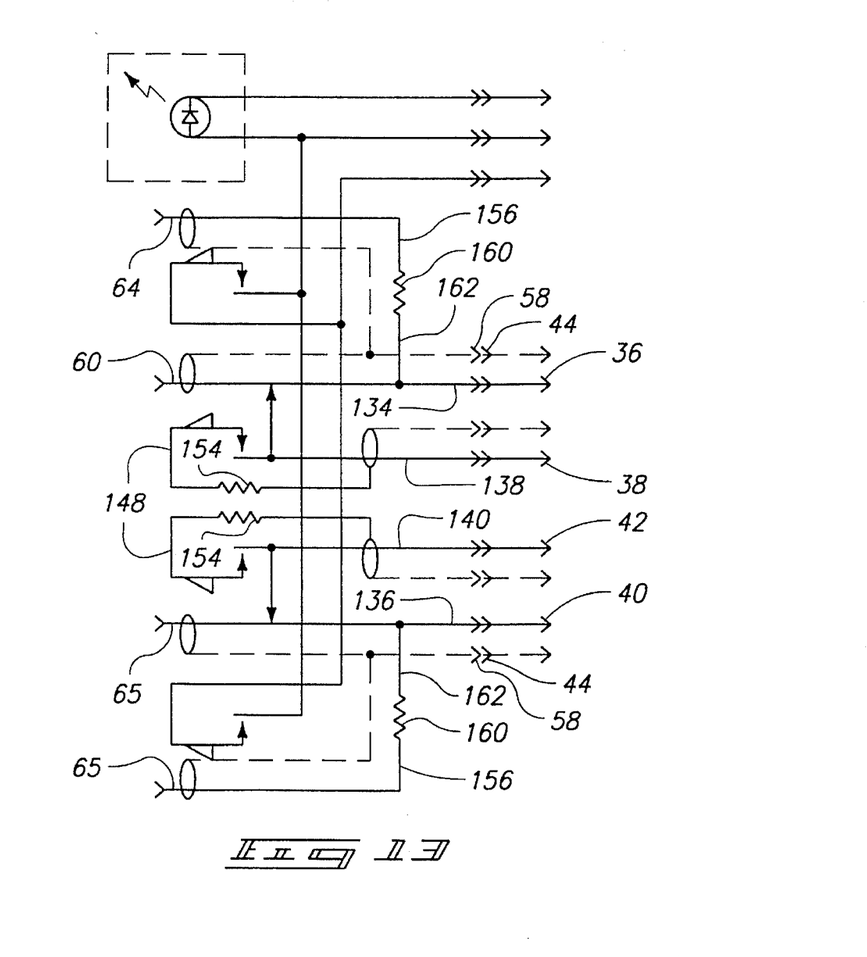
FIG. 13 is an electrical schematic of the inserted module shown in FIG. 9.

The module printed circuit board 50 as illustrated in schematic form in the electrical schematic FIG. 13 has an input printed circuit conductor or trace 134 that extends from the printed circuit board connector plug 58 to the printed circuit board jack terminal 80 of the central female conductor 76 of the input jack 60. The printed circuit board 50 includes an output printed circuit board conductor or trace 136 that extends between the printed circuit board coaxial connector plug 58 and the printed circuit board terminal 80 of the central female conductor 76 of the output jack 62.

The printed circuit board 50 further includes an input cross-connect printed circuit conductor or trace 138 that extends from the printed circuit board coaxial connector plug 58 to the printed circuit board jack terminal 102 of the input jack 60. Furthermore, the printed circuit board 50 includes an output cross-connect printed circuit conductor or trace 140 that extends between the coaxial connector plug 58 and the printed circuit board jack terminal 102 of the output jack 62. When a coaxial plug 170 is inserted in jack 60 the operator is able to patch the isolated digital signal from rear coaxial connector 36. When a coaxial plug 170 is inserted in jack 62, the operator is able to patch the isolated digital signal from rear coaxial connector 40.

The module 12 further includes jack switch termination circuits generally designated with the numeral 148 that are operatively connected to the printed circuit board terminals 116 of jacks 60 and 62 respectively for terminating the cross-connect digital signals on traces 138 and 140 respectively when the engaging end 112 of a jack switch engages the projecting leaf spring end 96. This is generally referred to as grounding although the digital signal is not directly terminated to ground but is terminated to a preset voltage through a known resistor 154 which is preferably in the neighborhood of 75 ohms. Consequently the jack switch may be referred to as a termination-before-break switch in which the digital cross-connect signal is terminated before the switch is opened to interrupt the digital signal between the telecommunication apparatus.

The module 12 further includes monitor circuits 156 that includes (1) resistors 160 in the lines that interconnects with the central conductor of the monitor jacks 64 and 65 and (2) monitor printed circuit board conductors or traces 162 that connect with respective input printed circuit board traces 134 and output printed circuit board traces 136.

Figure 14:
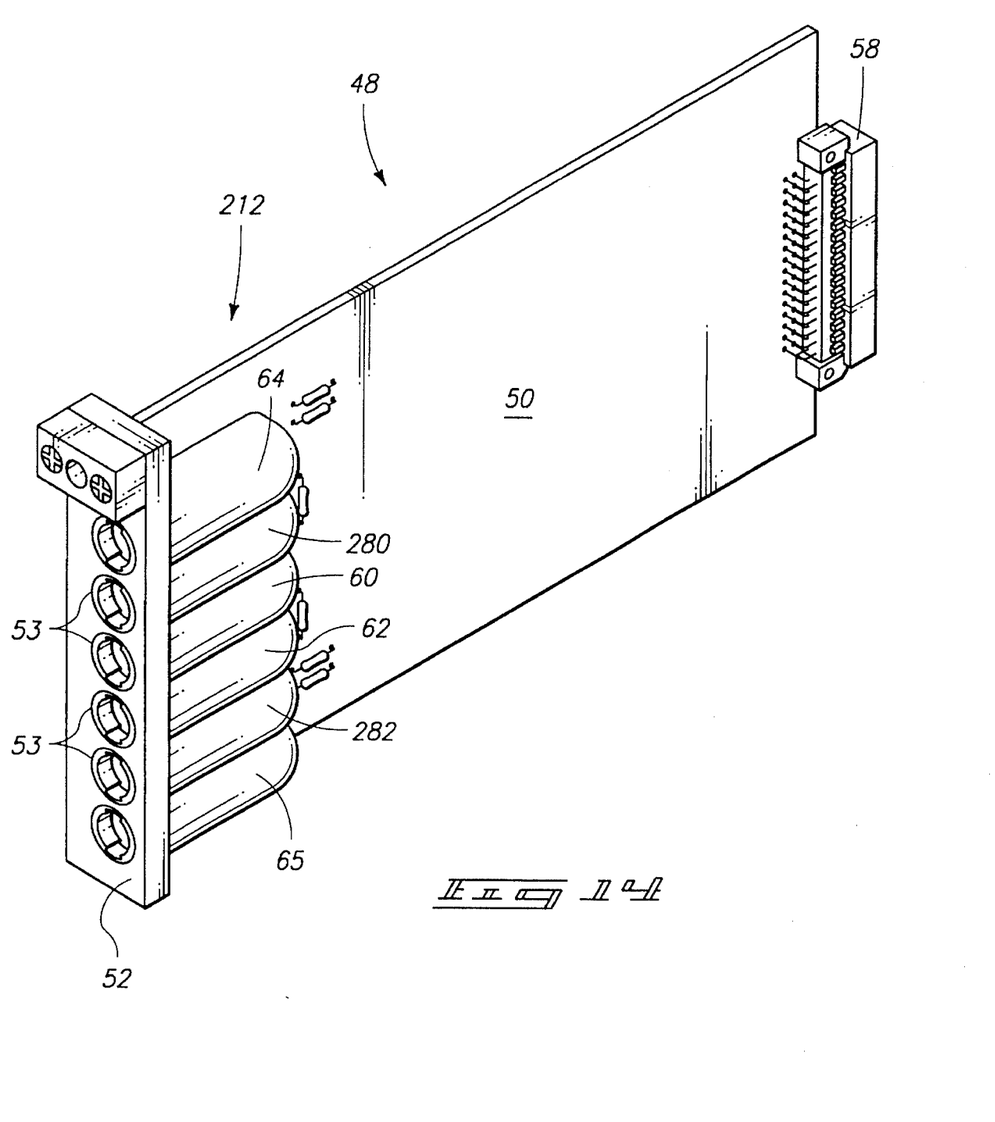
FIG. 14 is an isometric view of an alternate module for insertion into a complementary panel chassis.
Figure 15:
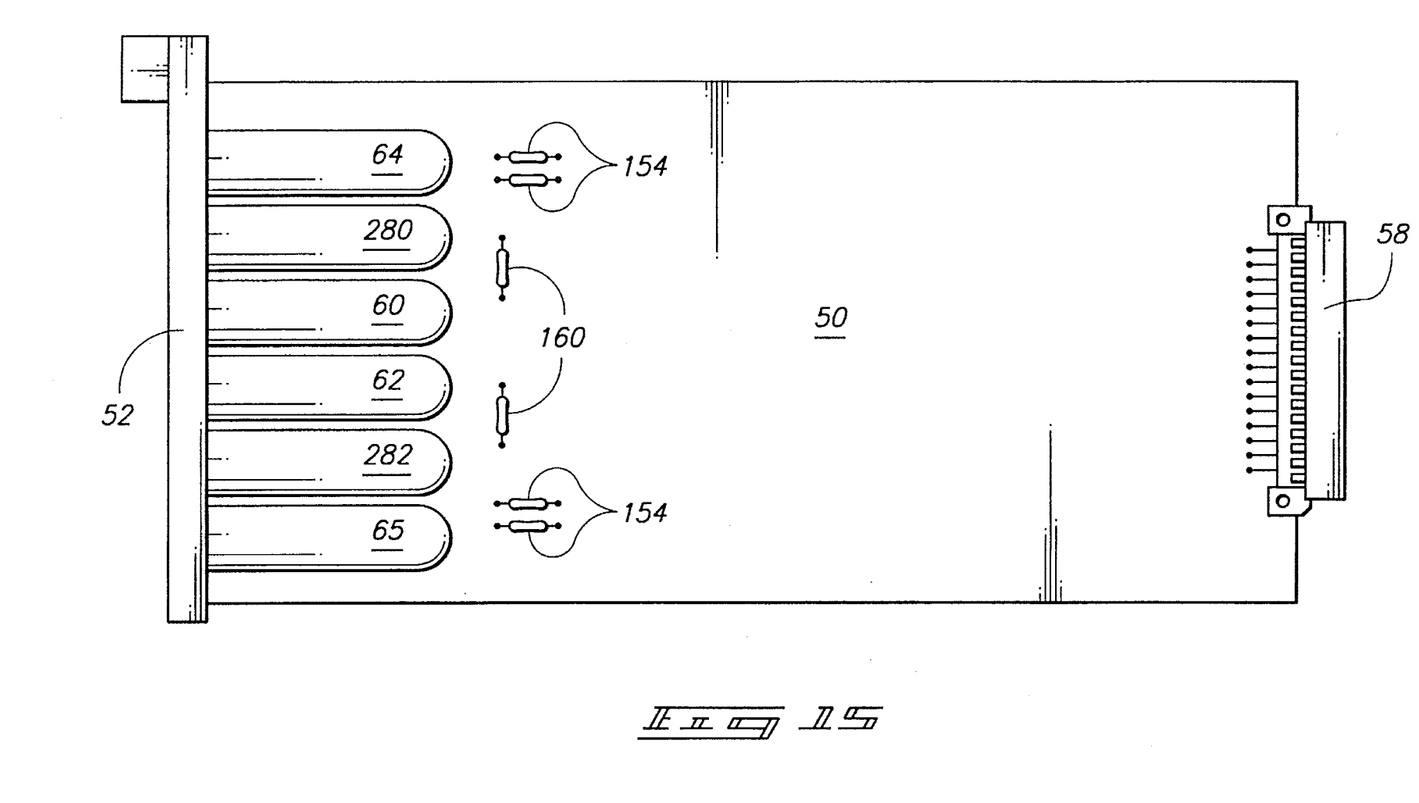
FIG. 15 is a side view of the alternate module shown in FIG. 14.
Figure 16:
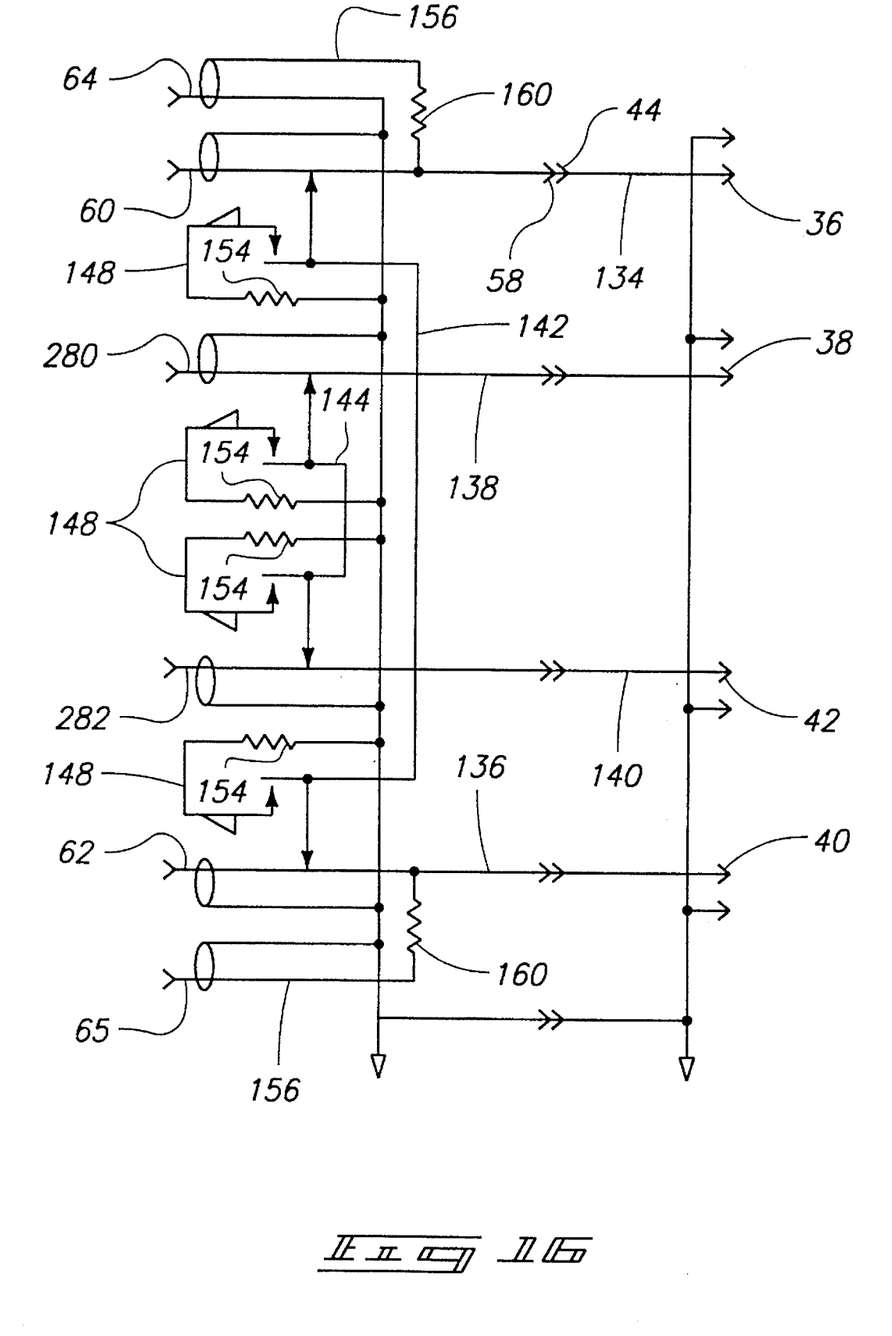
FIG. 16 is an electrical schematic of the module shown in FIG. 14 when the module is inserted into the complementary panel chassis.

An alternate embodiment of the module is illustrated in FIGS. 14–16 and is designated with the numeral 212. In addition to the coaxial jacks 60, 62, 64, and 65, the module 212 has an input cross-connect jack 280 and an output cross-connect jack 282 that are mounted at the front end of the module printed circuit board 50. However in this embodiment the input cross-connect printed circuit conductor or trace 138 extends from the printed circuit board coaxial connector plug 58 to the printed circuit board jack terminal 80 of the input cross-connect jack 280. Furthermore, the output cross-connect printed circuit conductor or trace 140 extends between the coaxial connector plug 58 and the printed circuit board jack terminal 80 of the output cross-connect jack 282.

The jack switch of the input jack 60 is connected in series with the jack switch of the output jack 62 utilizing an input switch printed circuit conductor or trace 142 on the printed circuit board. Likewise, the jack switch of the input cross-connect jack 280 is connected in series with the jack switch of the output cross-connect jack 282 via an output switch printed circuit conductor or trace 144. The conductor 144 extends between the printed circuit board switch terminals 102 to interconnect the jack switches of the input cross-connect jack 280 and the output cross-connect jack 282.

When a coaxial plug 170 is inserted in jack 280, the operator is able to patch the isolated digital signal from rear coaxial connector 38. When a coaxial plug 170 is inserted in jack 282, the operator is able to patch the isolated digital signal from rear coaxial connector 42.

It should be appreciated that the insertable modules 12 enables the installer to initially pre-wire the selected telecommunication apparatuses to the columns of backplane coaxial connectors 36, 38, 40, and 40 before the modules are needed. Consequently the modules do not need to be purchased until it is desirable to actively use the circuits. The chassis backkplane may be initially pre-wire for use as spares should the need arise.

The modules 12 may be inserted when it is desirable to cross-connect the apparatuses. During testing one module may be sequentially used to test the backplane circuits. The insertable modules 212 enable a tester, monitor or repair person to utilize a patch cord to isolate the digital signals on any one of the connectors 36, 38, 40, and 42 and reroute the isolated signals to different modules. The module 12, 212 greatly increases the ability of the transmission engineer and his staff to install additional capacity and to detect problems or abnormalities and to isolate the abnormalities and make a proper repair. Furthermore it is not necessary to install any of the modules 12 in order to connect the telecommunication apparatuses to the panel backplane. In this way the entire backplane may be pre-wired prior to inserting or mounting of the modules 12 or 212. Still further, once inserted a :module enables looping plugs to be utilized for testing or patching the circuits by rerouting the circuits directly from the front of the panel 10.

The module has a termination-before-break switch structure in each of the jacks 60, 62, 280 and 282 that reduces the amount of digital information that is lost in transmission from a cross-connect condition to a patch condition. Also the panel 10 enables a customer to select either the module 212 or the module 12 for insertion into the chassis. In this way a single panel chassis 14 is capable of receiving more than one type of module. Furthermore the module provides for a relatively inexpensive structure while providing substantial reliability and assemblability which reduces the cost and provides the customer with a more versatile product at the same or lower price than previous modules as illustrated in U.S. Pat. No. 5,233,501.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. In a telecommunication network digital cross-connect module panel for providing front panel access for monitoring, testing, or temporarily reconnecting various digital telecommunication apparatus, an elongated, normally horizontally mounted, panel chassis having a bottom wall, side walls, a backplane wall and an interior that is divided into a plurality of adjacent vertical slots;

said backplane wall includes a backplane printed circuit board having a front facing side and a back facing side;

a plurality of backplane coaxial cable connectors mounted on the back facing side of the backplane printed circuit board;

wherein the backplane coaxial cable connectors are arranged in a matrix of horizontally spaced vertical columns of coaxial cable connectors, in which each column of coaxial cable connectors are associated with a corresponding vertical slot, and wherein each column of backplane coaxial cable connectors comprises:

1) an input coaxial cable connector mounted to the back facing side of the backplane printed circuit board in which the input coaxial connector has a rear input digital signal central conductor for normally connecting through a coaxial cable to a digital signal input portion of one telecommunication apparatus;

2) an output coaxial cable connector mounted to the back facing side of the backplane printed circuit board in which the rear output coaxial cable connector has a output digital signal central conductor fox normally connecting through a coaxial cable to a digital signal output portion of the one telecommunication apparatus;

3) an input cross-connect coaxial cable connector mounted to the back facing side of the backplane printed circuit board in which the input cross-connect coaxial connector has a input cross-connect digital signal central conductor for normally connecting through a coaxial cable to a digital signal input portion of another telecommunication apparatus;

4) an output cross-connect coaxial cable connector mounted to the back facing side of the backplane printed circuit board in which the rear output cross-connect coaxial connector has a output cross-connect central conductor for normally connecting through a coaxial cable to a digital signal output portion of the other telecommunication apparatus;

a plurality of first mating elongated printed circuit board connectors mounted in vertical orientations on the front facing side of the backplane printed circuit board communicating with corresponding slots and wherein each first mating printed circuit board connector is electrically connected to a corresponding column of the backplane coaxial cable connectors;

a digital cross-connect module insertable into one of the slots for provide front panel access to monitor, test or temporarily reconnect the two of the digital telecommunication apparatus;

said cross-connect module having (1) a module printed circuit board extending between a front end and a rear end, (2) a front face plate with jack apertures mounted to the front end of the module printed circuit board, and (3) a second mating elongated printed circuit board connector on the rear end of the module printed circuit board for mating with the first mating elongated printed circuit board when the module is inserted into the one slot;

an input jack mounted on the module printed circuit board and having a forward open end positioned in one of the jack apertures for selectively receiving a coaxial electrical plug at the front face plate to electrically connect with an input jack central coaxial conductor;

an output jack mounted on the module printed circuit board and having a forward open end positioned in another of the jack apertures for selectively receiving a coaxial electrical plug at the front face plate to electrically connect with an output jack central coaxial conductor;

said input jack having an input jack switch responsive to the insertion of a plug into the input jack for (1) normally operatively electrically cross-connecting the input portion of the one telecommunication apparatuses with the input portion of the other telecommunication apparatus to transmit a digital input signal between the telecommunication apparatus when a plug is not inserted into the input jack, and (2) for discontinuing the cross-connecting of the one telecommunication apparatus with the input portion of the other telecommunication apparatus to interrupt transmission of the digital input signal between the telecommunication apparatus and permit electrical connection of the plug with the digital signal input portion of the one telecommunication apparatus when the plug is inserted into the input jack;

said output jack having an output jack switch responsive to the insertion of a plug into the output jack for (1) normally operatively electrically cross-connecting the output portion of the one telecommunication apparatus with the output portion of the other telecommunication apparatus to transmit a digital output signal between the telecommunication apparatuses when a plug is not inserted into the output jack, and (2) for operatively discontinuing the cross-connecting of the output portion of the one telecommunication apparatus with the output portion of the other telecommunication apparatus to interrupt transmission of the digital output signal between the telecommunication apparatus and permit electrical connection of the plug with the digital signal output portion of the one telecommunication apparatus when the plug is inserted into the output jack;

wherein each of the jack switches has (1) a first printed circuit board terminal operatively electrically connected to its respective central coaxial conductor, and (2) a second printed circuit board terminal;

said module printed circuit board having printed circuit conductors electrically interconnecting the second mating printed circuit board connector with (1) the first and second printed circuit board terminals of the input jack switch, and (2) the first and second printed circuit board terminals of the output jack switch.

2. In the telecommunication network digital cross-connect module panel as defined in claim 1 wherein the first mating printed circuit board connector is a female connector and the second mating printed circuit board connector is a male connector in which the first mating printed circuit board connector receives the second mating printed circuit board connector therein when the module is inserted into the one slot.

3. In the telecommunication network digital cross-connect module panel as defined in claim 1 wherein the panel chassis has a top wall and wherein the top wall and the bottom wall have complementary slot guides for facilitating the inserting of a module into a desired slot.

4. In the telecommunication network digital cross-connect module panel as defined in claim 2 wherein the female connector is a DIN receptacle and the male connector is a DIN plug.

5. In the telecommunication network digital cross-connect module panel as defined in claim 1 wherein the panel front plate has a slot formed therein to receive the forward end of the module printed circuit board and wherein the module has fastener means for securing the panel front plate to the forward end of the module printed circuit board.

6. In the telecommunication network digital cross-connect module panel as defined in claim 1 wherein the module printed circuit board has an inside surface and an outside surface and wherein the module printed circuit board connector is mounted on the inside surface for mating with the printed circuit board connector of the backplane printed circuit board.

7. In the telecommunication network digital cross-connect module panel as defined in claim 1 further comprising:

an input cross-connect jack having a forward open end positioned in another of the jack apertures for selectively receiving a coaxial electrical plug at the front panel to electrically connect with the input cross-connect coaxial cable connector;

an output cross-connect jack having a forward open end positioned in another of the jack apertures for selectively receiving a coaxial electrical plug at the front panel to electrically connect with an output cross-connect coaxial cable connector.

8. In the telecommunication network digital cross-connect module panel as defined in claim 1 wherein said input cross-connect jack having an input cross-connect jack switch responsive to the insertion of a plug into the input cross-connect jack for (1) normally operatively electrically cross-connecting the input portion of the one telecommunication apparatus with the input portion of the other telecommunication apparatuses to transmit a digital input signal between the telecommunication apparatus when a plug is not inserted into the input cross-connect jack, and (2) for discontinuing the cross-connecting of the one telecommunication apparatus with the input portion of the other telecommunication apparatus to interrupt transmission of the digital input signal between the telecommunication apparatus and permit electrical connection of the plug with the digital signal input portion of the one telecommunication apparatus when the plug is inserted into the input cross-connect jack.

9. In the telecommunication network digital cross-connect module panel as defined in claim 1 wherein said output cross-connect jack having an output cross-connect jack switch responsive to the insertion of a plug into the output cross-connect jack for (1) normally operatively electrically cross-connecting the output portion of the one telecommunication apparatus with the output portion of the other telecommunication apparatus to transmit a digital output signal between the telecommunication apparatuses when a plug is not inserted into the output cross-connect jack, and (2) for operatively discontinuing the cross-connecting of the output portion of the one telecommunication apparatus with the output portion of the other telecommunication apparatus to interrupt transmission of the digital output signal between the telecommunication apparatus and permit electrical connection of the plug with the digital signal output portion of the one telecommunication apparatus when the plug is inserted into the output cross-connect jack.

* * * * *